United States Patent [19]
Grennan et al.

[11] Patent Number: 5,994,804
[45] Date of Patent: Nov. 30, 1999

[54] AIR COOLED DYNAMOELECTRIC MACHINE

[75] Inventors: Robert Grennan, Stillman Valley; William Greenlee, Caledonia; David Halsey, Rockford; W. Glen Smith, Caledonia, all of Ill.

[73] Assignee: Sundstrand Corporation, Rockford, Ill.

[21] Appl. No.: 09/207,099

[22] Filed: Dec. 7, 1998

[51] Int. Cl.$^6$ .................................. H02K 9/00; H02K 9/04
[52] U.S. Cl. ...................... 310/60 R; 310/58; 310/60 A; 310/61; 310/62; 310/63
[58] Field of Search ................. 310/60 A, 60 R, 310/90.5, 90, 58, 59, 61, 62, 63

[56] References Cited

U.S. PATENT DOCUMENTS

| | | | |
|---|---|---|---|
| 1,121,014 | 12/1914 | Hobart | 310/61 |
| 1,193,897 | 8/1916 | Holbech | 310/58 |
| 1,577,303 | 3/1926 | Schurch | 310/58 |
| 1,728,564 | 9/1929 | Hague | 310/58 |
| 1,877,904 | 9/1932 | Laffoon | 310/58 |
| 2,413,525 | 12/1946 | Smith | 310/58 |
| 2,969,908 | 1/1961 | Dallenbach | 230/117 |
| 3,716,732 | 2/1973 | Tillma | 310/61 |
| 4,286,183 | 8/1981 | Montgomery | 310/62 |
| 4,383,191 | 5/1983 | Mizuyama et al. | 310/59 |
| 4,409,502 | 10/1983 | McCabria | 310/61 |
| 4,500,142 | 2/1985 | Brunet | 310/90.5 |
| 5,703,421 | 12/1997 | Durkin | 310/61 |
| 5,898,246 | 4/1999 | Hoffman | 310/60 R |

*Primary Examiner*—Nestor Ramirez
*Assistant Examiner*—Karl E. Tamal
*Attorney, Agent, or Firm*—Wood, Phillips, VanSanten, Clark & Mortimer

[57] ABSTRACT

The hydraulic components of a cooling circuit for a dynamoelectric machine are eliminated in a totally air cooled dynamoelectric machine which includes a rotor (12) rotatable about an axis (14) and including a central stack (20) of ferrous laminations (22) defining a plurality of radially outwardly directed circumferentially spaced poles (132), spaced shaft ends (24,26) on the axis (14) and extending from opposite sides of the stack (20) and a first air passage (46) in the stack (20). Magnetic journal bearings (54,56) and a magnetic thrust bearing (58,60) are provided for the shaft segments (24,26) and impellers (62) are located on opposite sides of the stack (20). A stator (16) surrounds the rotor (12) and includes windings (76) connected by end turns (94) located exteriorally of the stator (16). Axial winding coolant passages (152,158) are provided adjacent the windings (76) in the stator and radial passages (70,72) are located in the rotor and the stator and in fluid communication with an outlet (74) from the housing. Rotor coolant passages (130) are located in the stack (20) and all of the passages receive air from the impellers (62).

15 Claims, 7 Drawing Sheets

AIR COOLED DYNAMOELECTRIC MACHINE

FIELD OF THE INVENTION

This invention relates to dynamoelectric machines, and more particularly; to a high speed dynamoelectric machine that is totally air cooled.

BACKGROUND OF THE INVENTION

Dynamoelectric machines come in widely varying shapes, sizes and capacities. Some dynamoelectric machines are employed as motors while others are employed as generators. Some are employed as motor-generators, meaning they can be operated either as a motor or as a generator depending upon exactly what function is desired of the machine at a given point in time.

In some cases, volume and weight constraints are minimal while in others they are critical. For example, in aerodynamic applications, weight is always a concern and volume constraints are necessary lest the machine occupy too much volume of a vehicle or even contribute to a less efficient aerodynamic shape as a result of the bulk of the machine. Further, in aerodynamic applications, hi-power density constructions are commonplace to further minimize weight and bulk. And as a consequence of the high-power densities, more elaborate cooling schemes are required in such machines.

Most commonly, dynamoelectric machines utilized in aerospace environments are cooled through the use of hydraulic oil coolant that is pumped through cooling passages in both the rotor and the stator and other heat sensitive machine components. Of course, to reject heat from the hydraulic oil coolant, a hydraulic coolant oil to air heat exchanger is required. This in turn adds elements, expense, weight and bulk to the total dynamoelectric machine system. It also adds complexity in that coolant fittings must be such as to contain the hydraulic oil coolant at relatively high pressures and to prevent potentially hazardous leaks. Moreover, to provide coolant to rotating parts of the machines requires the presence of couplings which also adds to complexity and cost.

The problem is accentuated because many dynamoelectric machines operating in an aerospace environment operate at very high speeds to achieve the high power densities mentioned earlier and that, of course, requires greater precision and complexity of components.

Desirably, such a machine would be totally air-cooled. If that object could be obtained, system complexities associated with the hydraulic cooling circuit, and the associated weight and bulk are done away with entirely. The present invention is directed to achieving that object.

SUMMARY OF THE INVENTION

It is the principal object of the invention to provide a new and improved dynamoelectric machine. More specifically, it is an object of the invention to provide a dynamoelectric machine that is totally air-cooled, or at least substantially so.

An exemplary embodiment of the invention achieves the foregoing object in one implementation in a dynamoelectric machine that includes a rotor rotatable about an axis and including a central stack of ferrous laminations defining a plurality of radially outward directed, circumferentially spaced poles. The poles are separated by axially extending grooves and shaft ends on the axis extend from opposite sides of the stack. A first air passage extends between opposite sides of the stack. A first journal bearing journals one of the shaft ends. A second journal bearing journals the other of the shaft ends and a thrust bearing, including a thrust disc, is located on one of the shaft ends. Impellers are disposed on each of the opposite sides of the stack and are in fluid communication with the first air passage. A stator surrounds the rotor and has opposed ends and a plurality of axially extending windings connected by end turns located exteriorally of the stator iron. Winding cooling passages extend through the stator adjacent to the windings and terminate at its opposed ends. Radial passages are generally centrally located in the stator and extend between the radially inner and radially outer extremities thereof. A housing contains the rotor, the stator, the bearings and the shaft ends and has an inlet in fluid communication with the first air passage and at least one outlet radially outward of the stator. Axial passages generally at or near the interface of the housing and the stator and radially outward of the windings extend between opposed ends of the stator. The axial passages and the radial passages are in fluid communication with the outlet. Rotor cooling passages are disposed in the stack and extend axially between opposite sides thereof and are in fluid communication with the impellers thereat. The axially extending grooves in the rotor are also in fluid communication with the impellers. Radial passages are located in the rotor generally centrally thereof and in fluid communication with the rotor cooling passages and are generally aligned with the radial passages in the stator.

In another aspect of the invention, an air cooled dynamoelectric machine is provided and includes a housing having an air inlet means and an air outlet means. A stator is mounted within the housing and includes an open center and opposed ends. At least one winding is located in the stator and has opposed end turns within the housing at the opposed ends of the stator. A rotor is located within the open center of the stator and has oppositely directed shaft ends. Journal bearings within the housing are utilized to journal the rotor for rotation about an axis. A magnetic thrust bearing assembly is disposed within the housing and includes an electromagnetic armature about one of the shaft ends and a thrust disc on the one shaft end which extends radially therefrom into the bearing assembly. Cooling air passages are located within the rotor and the stator and are in fluid communication with the inlet means and the outlet means. Pumping vanes are located on the rotor for pumping cooling air from the inlet means to the outlet means through the passages. The thrust disc further is in fluid communication with the inlet means and the outlet means so that windage at the thrust bearing disc, during operation of the machine, additionally serves to pump cooling air through the machine.

In a preferred embodiment, the inlet means comprises two spaced inlets.

In a preferred embodiment, the outlet means comprise three spaced outlets.

Preferably, the two spaced inlets are at axially opposite ends of the machine and the thrust bearing disc is in fluid communication with both of the inlets.

In a highly preferred embodiment, one of the outlets is radially outward of the stator and the other of the outlets is radially outward of the thrust bearing disc.

According to another aspect of the invention, there is provided an air-cooled dynamoelectric machine including a housing with inlet and outlet means, a stator mounted within the housing and having an open center, at least one winding on the stator, exposed end turns, and a rotor within the open center of the stator as before. Bearings are disposed in the housing for journalling the rotor for rotation about an axis and rotor cooling air passages are disposed within the rotor and open to at least one end thereof. Stator cooling air passages are located within the stator and open to at least one end thereof. Pumping vanes are located on the rotor at the one end and are in fluid communication with the inlet means. The vanes are radially inward of the rotor cooling air passages. Means are provided to define an annular cooling air manifold at the one end of the rotor radially outward of the vanes to receive cooling air from the vanes. Axially opening ports are located in the manifold at a location radially outward of the pumping vanes and are connected to rotor cooling air passages and radially opening ports are located in the manifold and open toward the end turns.

In a highly-preferred embodiment, the rotor and stator air-cooling passages open to both ends of the rotor and the stator, respectively, and the pumping vanes are located on both ends of the rotor. The rotor includes an air-conducting passage radially inward of the pumping vanes and in fluid communication with the inlet means. In addition, there is one of the annular cooling air manifolds at each end of the rotor and each is provided with the axially opening and radially opening ports. The machine further includes a radially-directed central passage in both the rotor and the stator and connected to the air cooling passages and the outlet means.

In a highly-preferred embodiment, the winding includes spaced electrical conductors and the spaces between the conductors define the stator air-cooling passages.

When high speed operation is desired, preferably the journal bearings and the thrust bearing are all magnetic bearings.

Other objects and advantages will become apparent from the following specification taken in connection with the accompanying drawings.

DESCRIPTION OF THE PREFERRED EMBODIMENT

Figure 1:
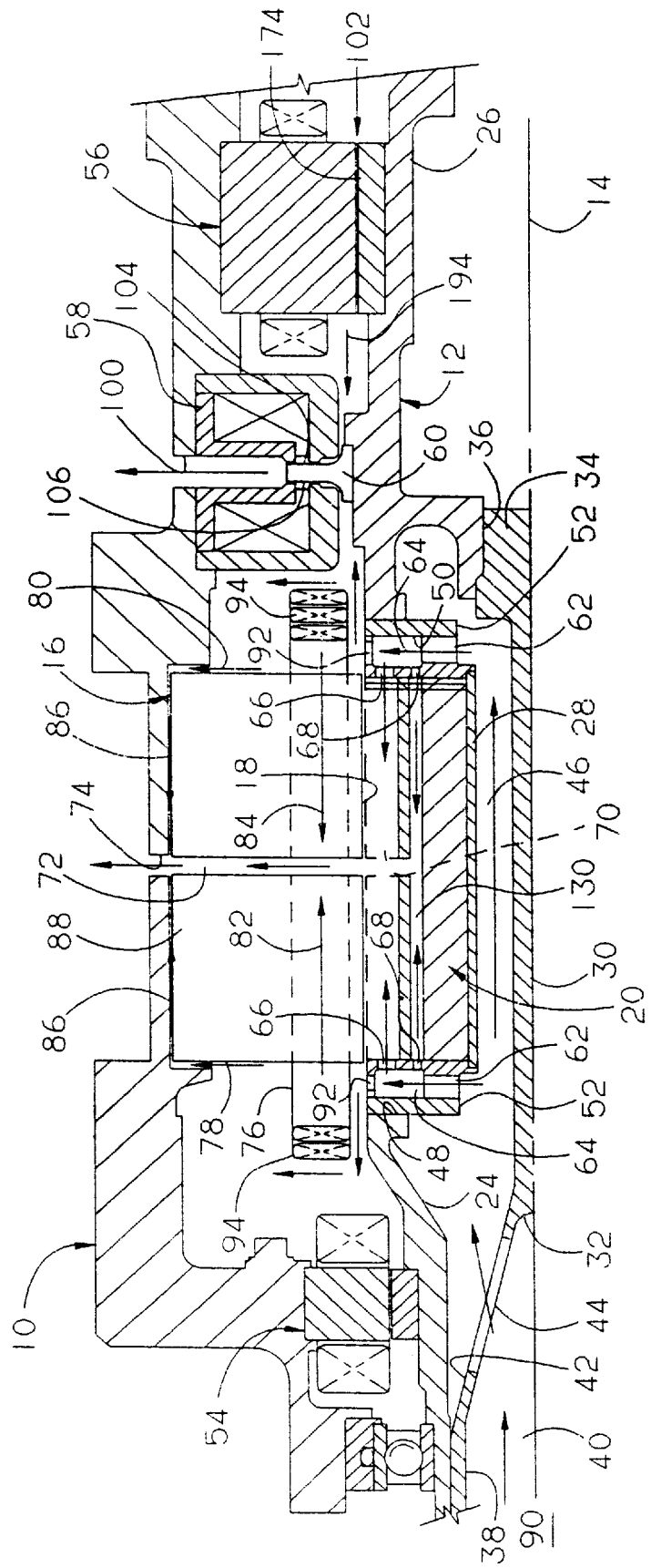
FIG. 1 is a somewhat schematic, partial cross-sectional view of a dynamoelectric machine made according to the invention.

An exemplary embodiment of a dynamoelectric machine made according to the invention is illustrated in the drawing. Although no restriction to intended use is intended, in one preferred usage of the invention, the dynamoelectric machine is employed as a motor/generator of the switched reluctance variety. Referring to FIG. 1, a general description of a preferred embodiment will be given followed by a more detailed description with reference to other figures of drawing.

The dynamoelectric machine includes a housing, generally designated 10, in which a rotor, generally designated 12 is journalled for rotation about an axis 14. Mounted within the housing 10 is a stator, generally designated 16, having a central opening 18 in which the rotor 12 defined by a lamination stack, generally designated 20, and made up of a plurality of ferromagnetic laminations 22 is located.

Shaft segments 24 and 26 are abutted against the right and left sides of the lamination stack 20 as viewed in FIG. 1 and are concentric with the axis 14. The lamination stack 20 includes an enlarged, central opening 28 through which a reduced diameter section 30 of a tie bolt 32 extends. The tie bolt 32 includes a threaded end 34 which is threaded into a threaded bore 36 in the shaft segment 26. At its opposite end, the tie bolt 32 includes an enlarged section 38 provided with an interior chamber 40. A necked down frusto-conical section 42 interconnects the enlarged section 38 and the reduced diameter section 30. It includes a series of openings 44 (only one of which is shown) to establish fluid communication between the chamber 40 and an annulus 46 defining an air passage between the reduced diameter section 30 of the tie bolt 32 and the central opening 28 in the lamination stack 20. The shaft section 24 is secured to the tie bolt 32 by any suitable means, typically threads, at its enlarged diameter end 38. Both the shaft sections 24 and 26 include axially facing, annular surfaces 48,50 which abut mating surfaces on respective vane and manifold assemblies 52 in turn abutting opposite ends of the lamination stack 20. The tie bolt 32 is in tension thus acts through the shaft segments, 24,26, to compress the lamination stack 20 via the manifold assemblies 52, which also act as clamping pieces, while locating the same in a position concentric with the axis 14. It will thus be appreciated that a shaftless rotor assembly is defined.

The shaft segment 24 is journalled by a magnetic journal bearing, generally designated 54, which may be of conventional construction. Similarly, the shaft segment 26 is journalled by a magnetic journal bearing, generally designated 56, whose construction will be described in greater detail hereinafter. The journal bearings 54 and 56 are contained within the housing 10.

An electromagnetic assembly 58 of a magnetic thrust bearing is mounted in the housing 10 about the shaft segment 26. The latter mounts a thrust disc 60 to absorb forces on the rotor 12 exerted in the axial direction.

The vane and manifold assemblies 52 on opposite ends of the lamination stack 20 include vanes 62 for pumping air into respective manifold chambers 64. The air may exit the manifold chamber 64 via axially directed ports 66 and 68 to cool the rotor 12. As cooling air enters from both ends of the lamination stack 20, generally centrally thereof, a series of radial passages 70 in the lamination stack 20 serve to direct air toward the stator 16. The stator has at least one central, radially extending passage 72 aligned with the passages 70 for receiving the air and conducting it to an outlet 74 in the housing 10.

The stator 16 includes a plurality of windings 76 which are spaced from one another to define axial air cooling passages within the stator 16 that extend inwardly toward the passage 72 from both ends 78,80 of the stator 16. These passages flow air in the direction of arrows 82,84 as will be described in greater detail hereinafter.

In addition, air cooling passages 86 extend axially toward the passage 72 and the outlet 74 at the interface of the housing 10 and the back iron 88 of the stator 16.

Cooling air is received from an inlet 90 shown schematically on the left-hand side of FIG. 1 and in fluid communication with the chamber 40 to provide the principal cooling of the rotor 12 and the stator 16. The cooling air enters the chamber 40 and exits the same via the openings 44 to flow to the vane and manifold assemblies 52. In the case of the right-hand manifold assembly 52 as shown in FIG. 1, the air flow is through the central passage 46 in the rotor 12.

The vanes 62 act as impellers to impel the air into the manifold 64. From there, air flows axially from the ports 66,68 through the cooling passages in the rotor to be described in greater detail to the radial passages 70. It also exits radially facing ports 92 to be directed to the end turns 94 of the windings 76. The end turns 94 are, of course, located exteriorally of the iron body making up the stator 16.

Such air may also enter the passages between the windings to flow in the direction of the arrows 82 and 84 lo the radial passage 72 for ultimate discharge through the outlet 74. In addition, the air flows along the sides 78,80 of the iron making up the stator 16 to the passages 86 to flow to the outlet 74 while cooling the back iron 88 of the stator 16. The cooling air exiting the ports 92 does not all follow the just described path. Some is used to cool the magnetic journal bearing 54. Thus, the housing 10 includes an outlet 96 (FIG. 2) which is radially outwardly directed and located between the magnetic journal bearing 54 and the inlet 90. The radially outward facing nature of the outlet 96 assures that heated air exiting the outlet 96 will not be reingested by the inlet 90.

The housing 10 includes an additional outlet 100 that is located radially outward of the thrust disc 60 and which extends into the magnet assembly 58. A further inlet, shown schematically at 102 on the right-hand side of FIG. 1, allows air to be drawn in to the housing 10 as a result of windage during operation of the machine. That is to say, air about the sides of the thrust disc 60, and in this instance, a side 104 thereof, is drawn in through the thrust-bearing 56 and pumped by the thrust disc 60 through the thrust bearing to cool the disc 60 and the right-hand side of the magnet assembly 58 of the magnetic thrust bearing.

The left-hand side 106 of the thrust disc 60 similarly acts to pump air received as a result of discharge from the manifold 64 through the radially facing ports 92 and cool through the left-hand side of the magnet assembly 58, as well as the left-hand side of the thrust disc 60.

Figure 2A:
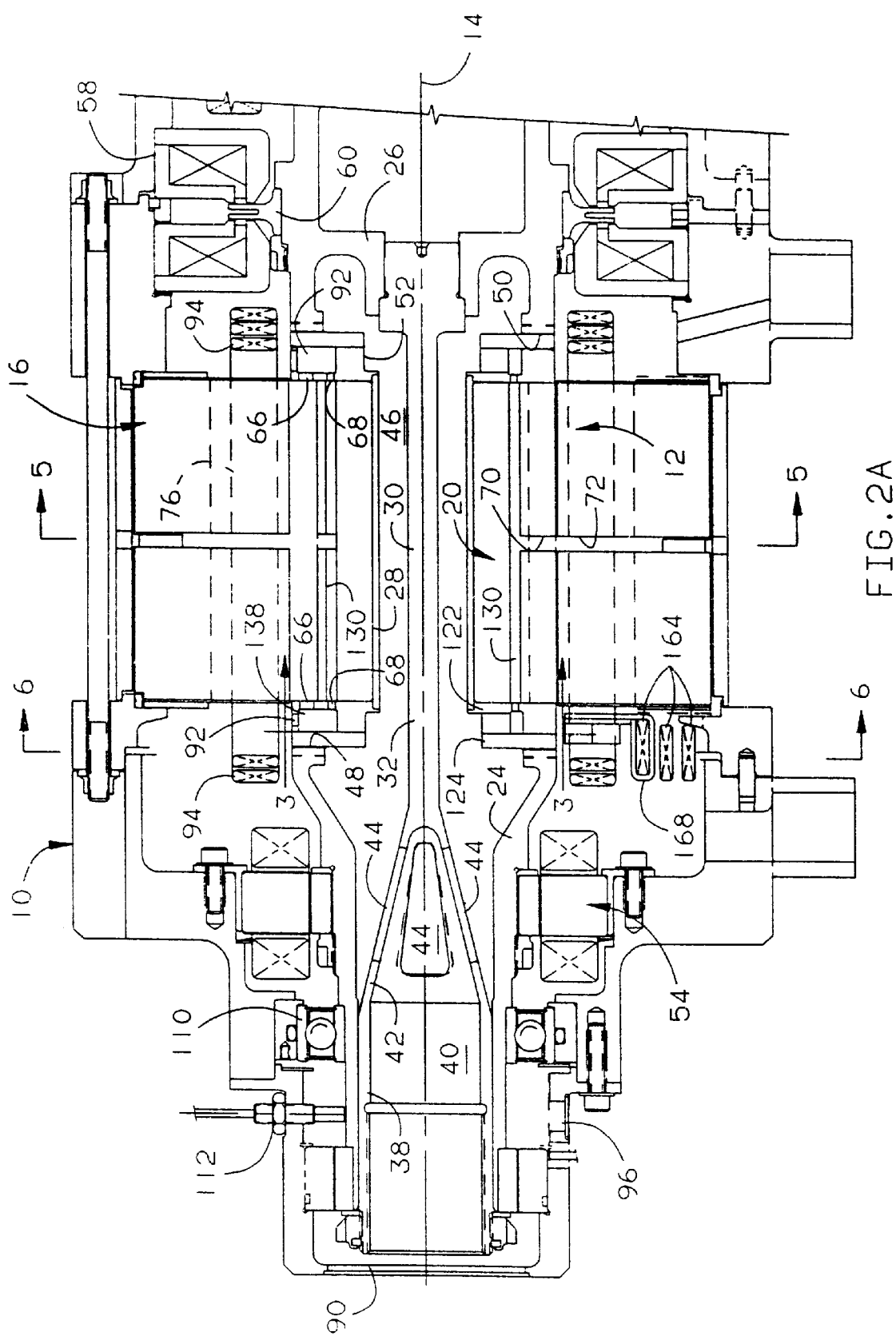
FIG. 2 is a detailed cross-sectional view of the dynamoelectric machine and is made up of FIGS. 2(*a*) and 2(*b*), with FIG. 2(*b*) intended to be placed to the right of and partially overlap FIG. 2(*a*)
Figure 2B:
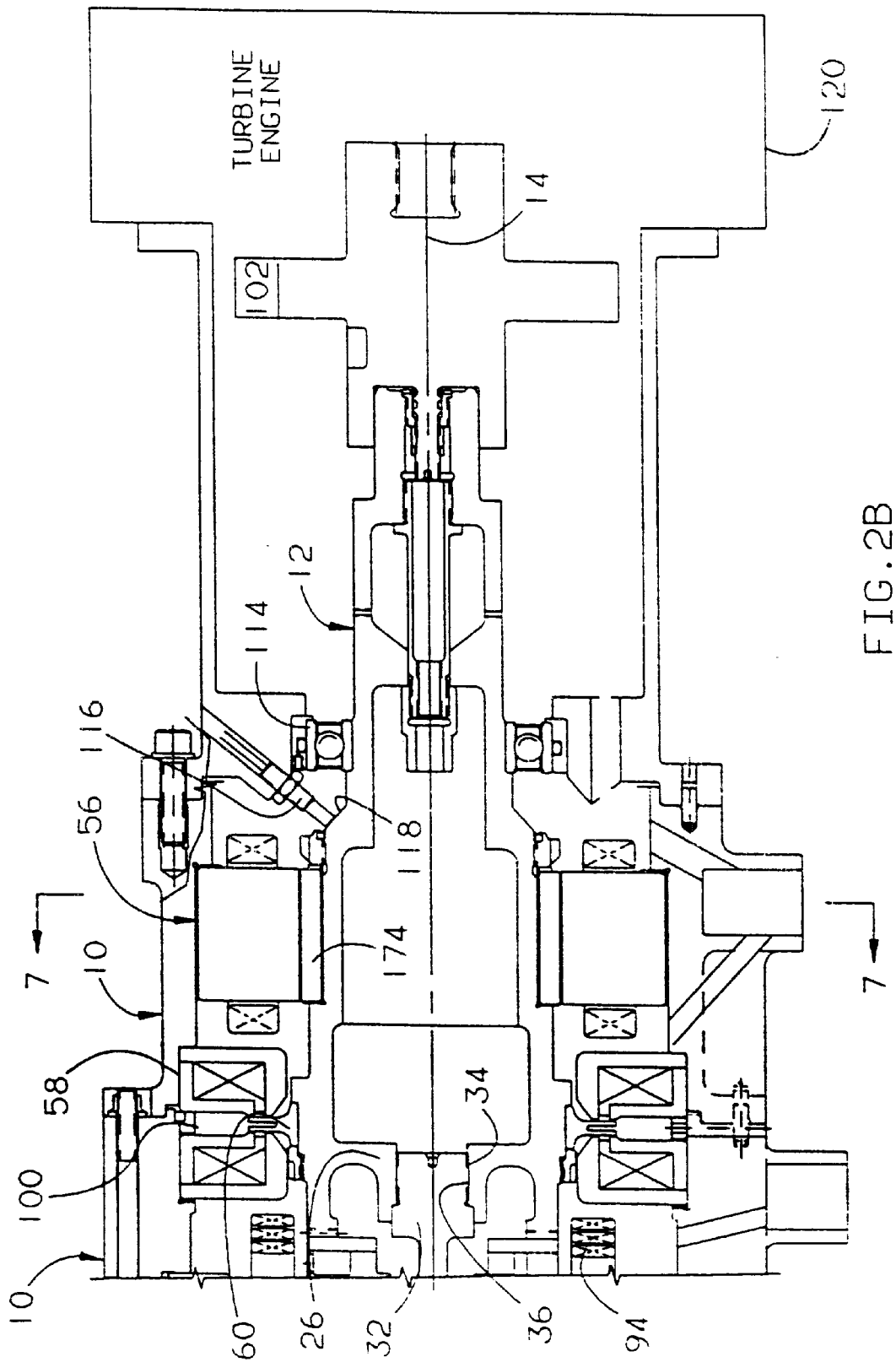

Turning now to FIGS. 2(a) and 2(b), the shaft segment 24 is also journalled by a conventional rolling element bearing 110 which is effective to properly located the rotor 12 near the axis 14 when the apparatus is quiescent. At all other times, journalling is accomplished by the magnetic journal bearings 54,56.

A sensor 112 is located in the left-hand end of the housing and is utilized to sense the location of the shaft segment 24 and provides suitable information to a control circuit for the magnetic bearing 54.

A conventional rolling element bearing 114 (FIG. 2(b)) journals the shaft segment 26 and serves the same function as the bearing 110. A sensor 116 is located at approximately a 45° angle to the axis 14 and in proximity to a ramped surface 118 on the shaft segment 26. The sensor 116 thus serves to sense shaft location in both the axial and radial directions and provides control signals for both the magnetic thrust bearing 58,60 and the magnetic journal bearing 56.

In one embodiment of the invention, the dynamoelectric machine is coupled to a gas turbine engine shown schematically at 120. In this capacity, the dynamoelectric machine may be used as a starter for the gas turbine engine and, once the gas turbine engine has reached operating speed, the dynamoelectric machine may be switched over to operation as a generator. It is thus ideally suited for use in, for example, an auxiliary power unit for aircraft.

It will be noted that a direct coupling between the turbine engine 120 and the dynamoelectric machine is contemplated, providing for a high speed device with high power densities.

Figure 3:
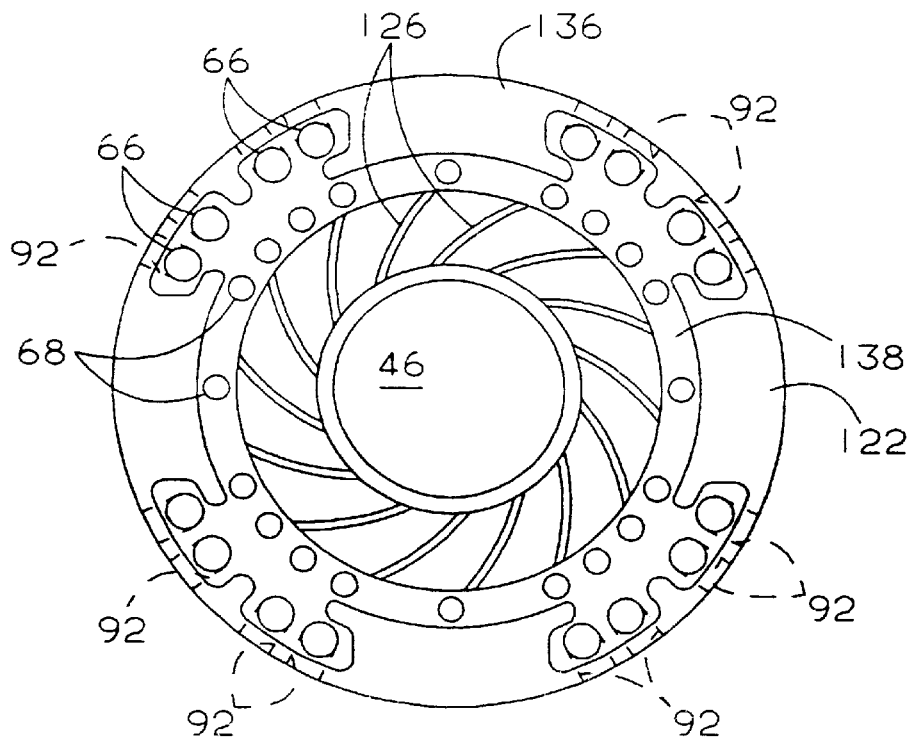
FIG. 3 is a sectional view taken approximately along the line 3—3 in FIG. 2(*a*)
Figure 4:
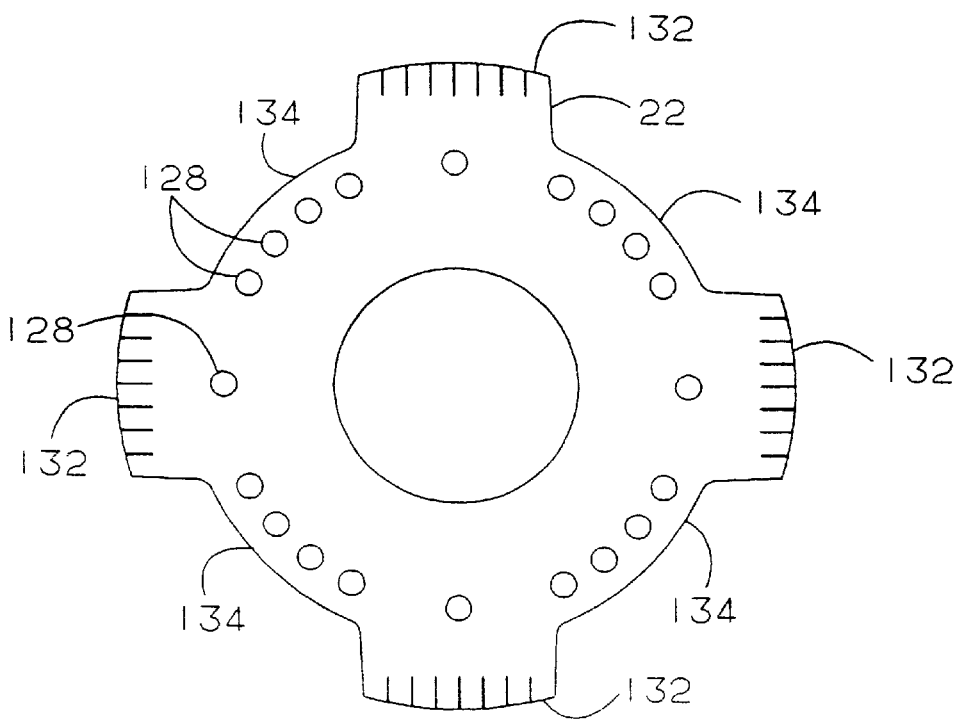
FIG. 4 is a side elevation of a single lamination used in the rotor of the dynamoelectric machine.

Returning to the vane and manifold assemblies 52 as illustrated in FIG. 3, the same will be described in greater detail. Each includes a vane mounting plate 122 which abuts a corresponding end of the lamination stack 20 and a closure plate 124 (FIG. 2A) which is abutted against the annular surface 48 on the shaft segment 24 or the annular surface 50 on the shaft segment 26 as the case may be. The closure plate 124 is simply an annular plate having a flat side abutting the manifold assemblies 52. On its opposite side, each closure plate has a coupling surface (not shown) such as a recess or key that mates with a key or a recess in the associated shaft segment 24,26. The vane mounting plate 122 is illustrated in FIG. 3 and is seen to include a plurality of generally spiralled vanes 126 which act as impellers for air ultimately received from the inlet 90. The vanes 126 on the vane mounting plate 122 associated with the shaft segment 24 are configured as the mirror image of the vanes 126 on the vane mounting plate 122 associated with the shaft segment 26 to assure that for the intended direction of rotation of the rotor 12, pumping of air will occur at both ends thereof. Just radially outward of the radially outer extremities of the vanes 126, the mounting plate 122 includes a series of openings which define the ports 68. A typical one of the laminations 22 is illustrated in FIG. 4 and is seen to include a series of bores 128 which align with the ports 68 to define axial passages 130 (FIGS. 1 and 2(a)). The axial passages extend to respective radial passages 70 in the rotor 12.

As can be seen in FIG. 4, the lamination stack 22 defines a plurality of circumferentially spaced poles 132 which are separated by recesses 134. When a series of the laminations 22 are arranged in the stack 20, the recesses 134 define axially extending grooves between the poles 132.

Cooling air is desirably flowed between the poles 132 of the lamination stack 20 toward the center thereof to be discharged through the radial passages 72 in the stator 16. To this end, referring to FIG. 3, additional apertures defining the ports 66 are located in the vane mounting plate 122 radially outward of the radially outward extremities of the vanes 126 and the ports 68. The same are located so as to discharge into the recesses 134 (FIG. 4) defining the axially extending grooves in the rotor 12.

Each of the vane mounting plates 122 includes a peripheral step 136. The step 136 has a thickness equal to the width of the vanes 126 and is abutted against the closure plate 124 so as to define a circumferential manifold chamber 138 radially outward of the vanes 126. The step 136 is relatively thin walled and the area of the ports 66 includes radially facing apertures which define the radially facing ports 92 (FIGS. 1 and 2(a)).

The radially inner side of each of the vane-mounting plates 122 is apertured and opens to a respective end of the central passage 46 in the rotor 12. As a consequence, air from the inlet 90 is pumped by the vanes 126 radially outward to the manifold chamber 138 from which it may flow through the ports 68 to the passages 130 in the lamination stack 20, through the ports 66 to the axial grooves between the poles 132, and through the radially facing ports 92 toward the end turns 94 (FIGS. 1 and 2(a)). The relative air flow in each of the paths mentioned is controlled by suitably selecting the sizes of the ports 66,68 and 92.

Figure 5:
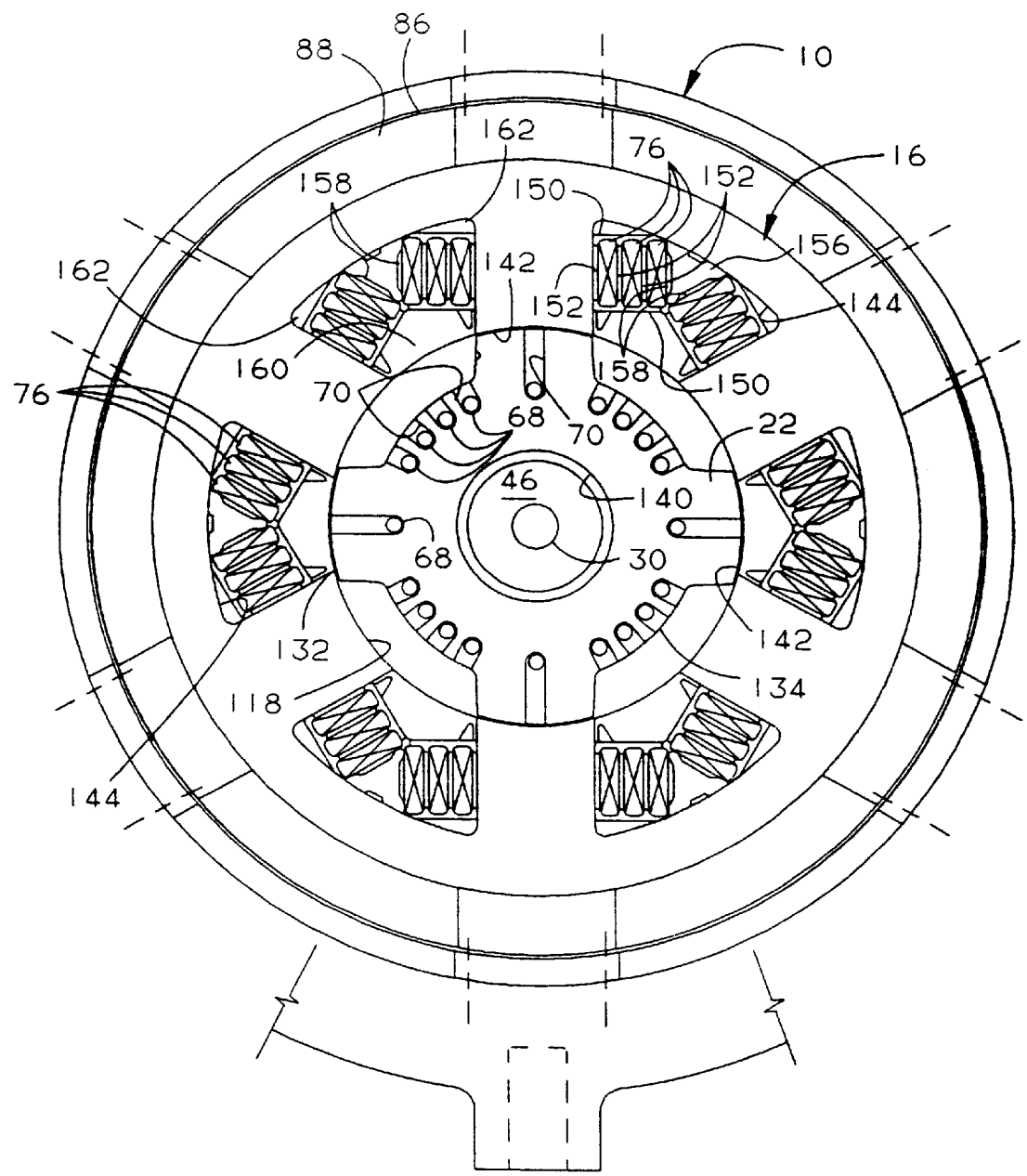
FIG. 5 is a sectional view taken approximately along the line 5—5 in FIG. 2(*b*)

Turning now to FIG. 5, the laminations 22 are mounted on a sleeve 140 concentric with the reduced diameter section 30 of the tie bolt 32. In the embodiment shown, the stator 16 is provided with six poles 142 separated by generally, but not strictly, trapezoidal slots 144 which receive the windings 76.

More specifically, each of the slots 144 receives six sets of windings 76 divided into two groups of three. The windings 76 of each set are separated by radially inner and radially outer comb-like spacers 150 to provide passages 152 between the windings 76. A triangular spacer 156 separates the windings 76 in each of the two groups and includes recesses 158 on its two inwardly facing surfaces which also define coolant passages 152. These passages provide for air flow in the direction of arrows 82,84 (FIG. 1) to the central radial passage 72. A pentagonal wedge block 160 is employed in each of the slots 144 along with wedge shaped spacers 162 to hold the windings in the proper location.

Figure 6:
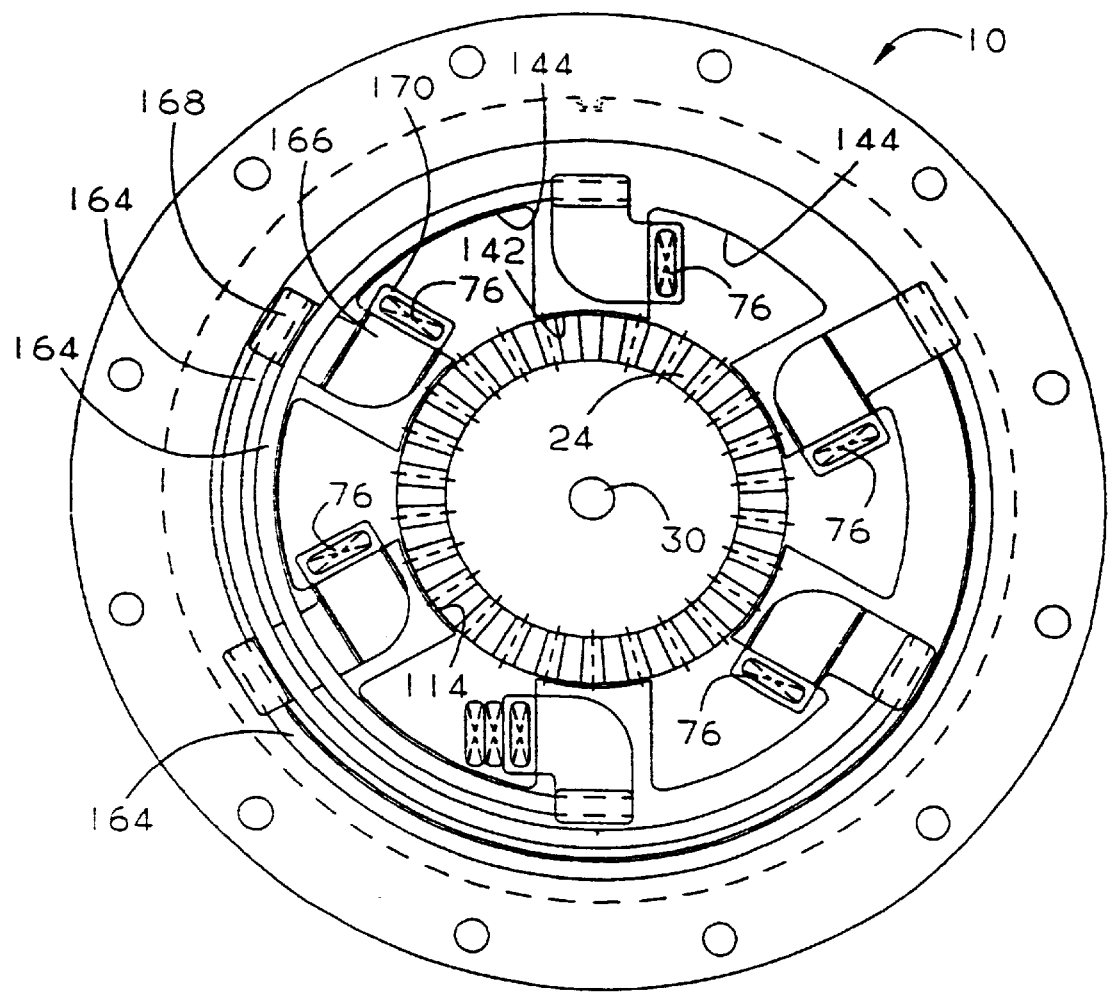
FIG. 6 is a sectional view taken approximately the line 6—6 in FIG. 2(*a*)

FIG. 6 illustrates the interconnection of the windings 76. Arcuate buses 164 having a circumferential extent of approximately 180° interconnect one of the windings 76 with another of the windings 76 in the diametrically opposite one of the slots 144. The buses 164 are radially spaced from one another and extend between connectors 166. As viewed in FIG. 6, the connectors 166 are L-shaped and have their radially outer ends provided with clamps 168 (FIGS. 2(a) and 6) which clamp about one end of an appropriate one of the buses 164. The opposite end of each of the connectors 166 has an axially opening clamp 170 at its radially inner end which is clamped to the associated winding 76.

The L-shaped configuration of each of the connectors 166 allows the body of each connector 166 to be disposed axially inwardly of the buses 164 to assure electrical isolation.

Figure 7:
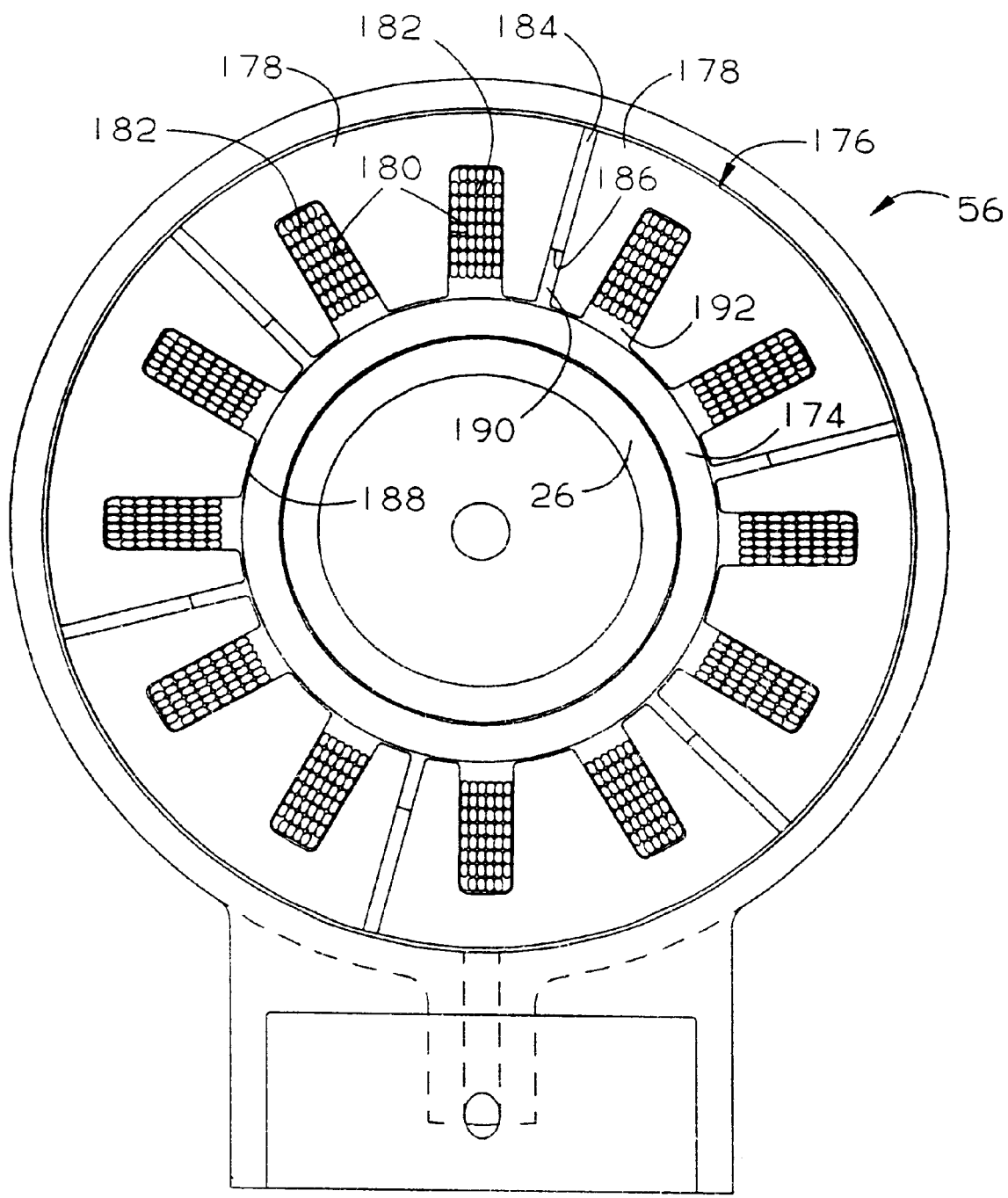
FIG. 7 is a sectional view taken approximately along the line 7—7 in FIG. 2(*b*).

Turning now to FIG. 7, the magnetic journal bearing 56 is seen to include an annular, magnetic flux carrying ring 174 affixed to the shaft segment 26 to be rotatable therewith. Surrounding the flux carrying ring 174 is a magnet assembly, generally designated 176. The magnet assembly 176 is made up of a plurality of pole pieces 178, in the illustrated embodiment, six in number. Each pole piece includes axially extending, winding receiving grooves 180 in which electrical windings 182 are received. Adjacent ones of the pole pieces 178 are separated by spacers 184. It is to be noted that the radially inner end 186 of each spacer 184 is recessed radially outward from the air gap 188 that exists between the flux carrying ring 174 and the pole pieces 178.

As a consequence, axial air passages 190 exist between adjacent pole pieces 176. In addition, the windings 182 do not completely fill the recesses 180 thereby providing additional air cooling passages 192 radially inward of the windings 182.

As alluded to previously, the frictional drag or windage of air on the side 104 of the thrust disc 60 acts as a pump to draw air from the inlet 102 (FIG. 1 and 2(b)) through the magnetic bearing 56, and specifically, through the passages 188, 190 and 192, to provide cooling of the components thereof. Such air further passes in the direction of an arrow 194 (FIG. 1) to the side 104 of the thrust disc 60 to ultimately be ejected out of the outlet 100. In the process, the magnet assembly 58, and the right-hand side 104 of the thrust disc 60, are cooled by the air flow.

From the foregoing, it will be appreciated that a dynamoelectric machine made according to the invention is capable at operating at extremely high rotational rates to provide substantial power generating capability and yet may be made of relatively small size to achieve a desirable high power density, particularly useful in aerospace applications. The machine is totally air cooled, thereby eliminating many components heretofore required in oil cooled machines. For example, heat exchangers, rotary couplings, coolant conduits interconnecting the same and the like are all eliminated, minimizing system complexity while providing both a volume savings and a weight savings as well.

The invention provides multiple air cooling paths through both the rotor and the stator to assure adequate cooling. Moreover, both the rotor and the stator receive cooling air from both sides which serves to minimize the potential for the formation of hot spots as would be the case if the coolant were passed from one end of the rotor or stator to the other.

The use of the thrust bearing disc to draw cooling air through other machine components to cool the same as well as the magnetic thrust bearing enhances machine efficiency. Thus, a highly desirable, totally air cooled dynamoelectric machine is provided.

We claim:

1. An air cooled dynamoelectric machine comprising:

a rotor rotatable about an axis and including a central stack of ferrous laminations defining a plurality of radially outward directed, circumferentially spaced poles, said poles being separated by axially extending grooves, said stack having a central opening therethrough and concentric with said axis, spaced shaft segments on said axis and sandwiching said stack, a tie bolt extending between said shaft segments through said central opening in spaced relation to said stack to define a first air passage between said tie bolt and said stack, said tie bolt further joining said shaft segments to clamp said shaft segments against opposite sides of said track;

a first magnetic journal bearing journalling one of said shaft segments;

a second magnetic journal bearing journalling the other of said shaft segments;

a magnetic thrust bearing including a thrust disc on one of said shaft segments;

impellers on each of said opposite sides of said stack and in fluid communication with said first air passage;

an air chamber in said tie bolt at one end thereof and in fluid communication with said first air passage;

a stator surrounding said rotor and having opposed ends and a plurality of axially extending windings connected by end turns located exteriorly of said stator;

spacers between said windings to define winding coolant passages through said stator adjacent said windings and terminating at said opposed ends;

radial passages generally centrally located in said stator and extending between the radially inner and radially outer extremities of said stator;

a housing containing said rotor, said stator, said bearings and said shaft segments and having an inlet in fluid communication with said air chamber, and at least one outlet radially outward of said stator;

axial passages generally at or near the interface of said housing and said stator and extending between said opposed ends;

said axial passages and said radial passages being in fluid communication with said outlet;

rotor cooling passages in said stack and extending axially between said opposite sides and in fluid communication with the impellers thereat, said axial grooves further being in fluid communication with said impellers; and radial passages in said rotor generally centrally thereof and in fluid communication with said rotor cooling passages and generally aligned with said radial passages in said stator.

2. The dynamoelectric machine of claim 1 wherein one side of said thrust disc is in fluid communication with said first air passage.

3. The dynamoelectric machine of claim 2 further including an additional outlet in said housing and in fluid communication with said thrust disc one side.

4. The dynamoelectric machine of claim 1 wherein said magnetic thrust bearing is located between said stack and one of said magnetic journal bearings, and said housing includes an additional inlet on a side of said one magnetic journal bearing remote from said thrust disc and in fluid communication with said thrust disc via said one magnetic journal bearing whereby said thrust disc serves to draw air from said additional inlet into said housing to cool said one magnetic journal bearing and said thrust disc.

5. The dynamoelectric machine of claim 4 further including an additional outlet in said housing in proximity to said thrust disc to receive cooling air therefrom.

6. An air cooled dynamoelectric machine comprising:
a rotor rotatable about an axis and including a central stack of ferrous laminations defining a plurality of radially outward directed, circumferentially spaced poles, said poles being separated by axially extending grooves, shaft ends on said axis extending from opposite sides of said stack, and a first air passage extending between opposite sides of said stack;
a first journal bearing journalling one of said shaft ends;
a second journal bearing journalling the other of said shaft ends;
a thrust bearing including a thrust disc on one of said shaft ends;
impellers on each of said opposite sides of said stack and in fluid communication with said first air passage;
a stator surrounding said rotor and having opposed ends and a plurality of axially extending windings connected by end turns located exteriorly of said stator;
winding coolant passages extending through said stator adjacent said windings and terminating at said opposed ends;
radial passages generally centrally located in said stator and extending between the radially inner and radially outer extremities of said stator;
a housing containing said rotor, said stator, said bearings and said shaft ends and having an inlet in fluid communication with said first air passage, and at least one outlet radially outward of said stator;
axial passages generally at or near the interface of said housing and said stator and radially outward of said windings and extending between said opposed ends;
said axial passages and said radial passages being in fluid communication with said outlet;
rotor cooling passages in said stack and extending axially between said opposite sides and in fluid communication with the impellers thereat, said axially extending grooves further being in fluid communication with said impellers; and
radial passages in said rotor generally centrally thereof and in fluid communication with said rotor cooling passages and generally aligned with said radial passages in said stator.

7. An air-cooled dynamoelectric machine, comprising:
a housing having an air inlet means and an air outlet means;
a stator mounted within said housing and including an open center and opposite ends;
at least one winding at said stator and having exposed end turns within said housing at said opposed ends;
a rotor within said open center and having oppositely directed shaft ends;
bearings in said housing journalling said rotor for rotation about an axis;
rotor cooling air passages within said rotor and opening to at least one end thereof;
stator cooling air passages within said stator and opening to at least one end thereof;
pumping vanes on said rotor at said one end and in fluid communication with said inlet means, said vanes being radially inward of said rotor cooling air passages;
means defining an annular cooling air manifold at said rotor one end radially outward of said vanes and receiving cooling air from said vanes;
axially opening ports in said manifold at a location radially outward of said pumping vanes and connected to said rotor cooling air passages; and
radially opening ports in said manifold and opening toward said end turns.

8. The dynamoelectric machine of claim 7 wherein said rotor and stator air cooling passages open to both ends of said rotor and said stator, respectively, and said pumping vanes are located on both ends of said rotor, said rotor including an air conducting passage radially inward of said pumping vanes and in fluid communication with said inlet means, there further being one of said annular cooling air manifolds at each end of said rotor and each having said axially opening and radially opening ports, and a radially directed central passage in both said rotor and said stator connected to said air cooling passages and said outlet means.

9. The dynamoelectric machine of claim 8 wherein said winding includes spaced electrical conductors, the spaces between said conductors defining said stator air cooling passages.

10. An air cooled dynamoelectric machine comprising:
a rotor rotatable about an axis and including a central stack of ferrous laminations defining a plurality of radially outward directed, circumferentially spaced poles, spaced shaft ends on said axis and extending from opposite sides of said stack, a first air passage in said stack;
a first magnetic journal bearing journalling one of said shaft ends;
a second magnetic journal bearing journalling the other of said shaft ends;
a magnetic thrust bearing including a thrust disc on one of said shaft ends;
impellers on each of said opposite sides of said stack radially outward of and in fluid communication with said first air passage;
a stator surrounding said rotor and having opposed ends and a plurality of axially extending windings connected by end turns located exteriorly of said stator;
radial passages generally centrally located in said stator and extending between the radially inner and radially outer extremities of said stator;

a housing containing said rotor, said stator, said bearings and said shaft ends and having an inlet in fluid communication with said first air passage, and an outlet radially outward of said stator;

said axial passages and said radial passages being in fluid communication with said outlet;

rotor cooling passages in said stack and extending axially between said opposite sides and radially outward of in fluid communication with the impellers thereat, said axially extending grooves further being in fluid communication with said impellers; and radial passages in said rotor generally centrally thereof and in fluid communication with said rotor cooling passages and generally aligned with said radial passages in said stator.

11. The dynamoelectric machine of claim 10 wherein one side of said thrust disc is in fluid communication with said first air passage.

12. The dynamoelectric machine of claim 11 further including an additional outlet in said housing and in fluid communication with said thrust disc one side.

13. The dynamoelectric machine of claim 10 wherein said magnetic thrust bearing is located between said stack and one of said magnetic journal bearings, and said housing includes an additional inlet on a side of said one magnetic journal bearing remote from said thrust disc and in fluid communication with said thrust disc via said one magnetic journal bearing whereby said thrust disc serves to draw air from said additional inlet into said housing to cool said one magnetic journal bearing and said thrust disc.

14. The dynamoelectric machine of claim 13 further including an additional outlet in said housing in proximity to said thrust disc to receive cooling air therefrom.

15. The dynamoelectric machine of claim 10 wherein said shaft ends are defined by separate spaced shaft segments.

* * * * *

UNITED STATES PATENT AND TRADEMARK OFFICE
CERTIFICATE OF CORRECTION

PATENT NO. : 5,994,804
DATED : November 30, 1999
INVENTOR(S) : Robert Grennan et al.

It is certified that error appears in the above-identified patent and that said Letters Patent is hereby corrected as shown below:

Column 1,
Line 8, insert the following:
-- This invention was made with government support under Contract No.: F33615-95-C-2509 with the United States Air Force. The government therefore has certain rights in this invention. --.

Signed and Sealed this

Thirty-first Day of January, 2006

JON W. DUDAS
*Director of the United States Patent and Trademark Office*